United States Patent [19]
Heller et al.

[11] 3,740,595
[45] June 19, 1973

[54] WATER COOLED ROTOR FOR DYNAMOELECTRIC MACHINES

[75] Inventors: Paul R. Heller, Murrysville; Sui-Chun Ying; James E. Luzader, both of Monroeville, all of Pa.

[73] Assignee: Westinghouse Electric Corporation, Pittsburgh, Pa.

[22] Filed: July 28, 1971

[21] Appl. No.: 166,684

[52] U.S. Cl. .................................. 310/54, 310/64
[51] Int. Cl. ............................................. H02k 9/00
[58] Field of Search ................ 310/52, 53, 54, 58, 310/, 59, 61, 64

[56] References Cited
UNITED STATES PATENTS

| | | | |
|---|---|---|---|
| 3,497,736 | 2/1970 | Cuny | 310/54 |
| 2,736,825 | 2/1956 | Hill | 310/54 |
| 3,243,616 | 3/1966 | Tudge | 310/54 |
| 3,582,977 | 6/1971 | Smith | 310/54 |
| 2,214,616 | 9/1940 | Jenks | 310/53 |

FOREIGN PATENTS OR APPLICATIONS

| | | | |
|---|---|---|---|
| 1,146,912 | 3/1969 | Great Britain | 310/54 |

*Primary Examiner*—R. Skudy
*Attorney*—A. T. Stratton and F. P. Lyle

[57] ABSTRACT

A water cooled rotor for large turbine generators in which the water passages are protected against corrosion by liners of stainless steel or other corrosion resistant material. In order to permit differential thermal expansion, the liner in the axial shaft bore includes a bellows of special design to absorb the expansion of the liner.

4 Claims, 2 Drawing Figures

WATER COOLED ROTOR FOR DYNAMOELECTRIC MACHINES

BACKGROUND OF THE INVENTION

The present invention relates to the cooling of dynamoelectric machines, and more particularly to a liquid cooled rotor for machines of large size such as turbine generators.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size. The coolant used in these machines has usually been hydrogen which fills the gas-tight housing and is circulated by a blower on the rotor shaft through the ducts of the stator and rotor windings and through suitable ducts in the stator core.

As the maximum ratings required in large generators have continued to increase, it has become necessary to further improve the cooling of these machines in the largest sizes. A substantial improvement in cooling can be obtained by the use of more efficient coolant fluids such as liquids. This has been done in stators by circulating a liquid coolant such as water through the ducts of the stator winding, and a substantial improvement in cooling has thus been obtained. A substantial further improvement can be obtained by applying liquid cooling to the rotor by circulating water or other suitable liquid through passages in the rotor windings.

There are many problems involved in circulating a liquid coolant through the rotor of a large generator. One of the most difficult problems is that of introducing the water into the rotor and discharging it therefrom. This is preferably done as close to the axis as possible where the pressure in the liquid is at its lowest value, and one suitable construction for this purpose is shown in a copending application of L. P. Curtis et al, Ser. No. 144,050, filed May 17, 1971, and assigned to the assignee of the present invention. In this construction, the liquid is introduced through an annular passage in the axial bore at one end of the rotor shaft and flows from this passage through radial passages to an annular distribution chamber on the rotor surface from which it flows to the passages in the winding conductors. At the discharge end of the rotor, the liquid flows from the conductors to a similar chamber and through radial passages to the central bore of the rotor through which it flows to the end of the shaft and is discharged through radial passages with suitable sealing means.

Since the heated water flowing through the passages in the rotor can be quite corrosive, it is necessary to protect the steel of the rotor from corrosion. This is done in accordance with the present invention by providing liners for all passages through which the water flows. These liners may be made of any suitable corrosion resistant material but are preferably made of stainless steel. When stainless steel liners are used in this manner, the liners become heated from the heated water flowing through them and tend to expand more than the steel rotor, both because they are at a somewhat higher temperature and because they may have a greater coefficient of thermal expansion than the special alloy steel of which the rotor is usually made. Excessive stresses and possible damage can therefore result if provision is not made to permit this differential thermal expansion of the liner. When a long tubular liner such as is used in the bores of the rotor shaft is utilized, it is possible in some instances to provide for thermal expansion of the liner by anchoring it at one end only and permitting it to move axially relative to the shaft, as shown for example at the entrance end of the rotor in the above mentioned Curtis et al application, and as proposed in Cuny et al U.S. Pat. No. 3,497,736. This solution of the problem, however, is not available where the liner must be attached at both ends to fixed points in the rotor. Thus, at the discharge end of the rotor, the water flows through radial passages to the bore of the shaft and through the bore to a second set of radial passages near the end of the shaft through which it is discharged. The stainless steel liner in the shaft bore between the two sets of radial passages must be anchored to radial stainless steel tubes in the passages at both ends, and if the liner is of substantial length, as is the case in the very large generators for which the invention is intended, the differential thermal expansion will be sufficient to stress the radial tubes beyond permissible limits.

SUMMARY OF THE INVENTION

In accordance with the present invention, differential thermal expansion of a stainless steel liner in the shaft bore of a large rotor is provided for by means of a bellows device inserted in the liner to absorb the expansion of the liner. Conventional bellows devices are not suitable for this purpose since they usually have thin walls for flexibility, so that they are susceptible to corrosion or erosion resulting in relatively short life, and usually would have essentially line contact between the outer periphery of the bellows convolutions and the rotor surface, which would cause excessive bearing pressure and would be undesirable. A bellows of special design is therefore utilized in the present invention having relatively thick diaphragm portions with essentially cylindrical exterior surfaces for contact with the shaft to minimize any tendency to corrosion or erosion and to reduce the contact pressure due to the centrifugal forces. The bellows also includes provisions for preventing accumulation of corrosive debris in the bellows and for making it sufficiently rigid while maintaining sufficient flexibility to absorb the longitudinal expansion of the stainless steel liner in which it is inserted.

BRIEF DESCRIPTION OF THE DRAWINGS

The invention will be more fully understood from the following detailed description of an illustrative embodiment, taken in connection with the accompanying drawings, in which.

DESCRIPTION OF A PREFERRED EMBODIMENT

Figure 1:
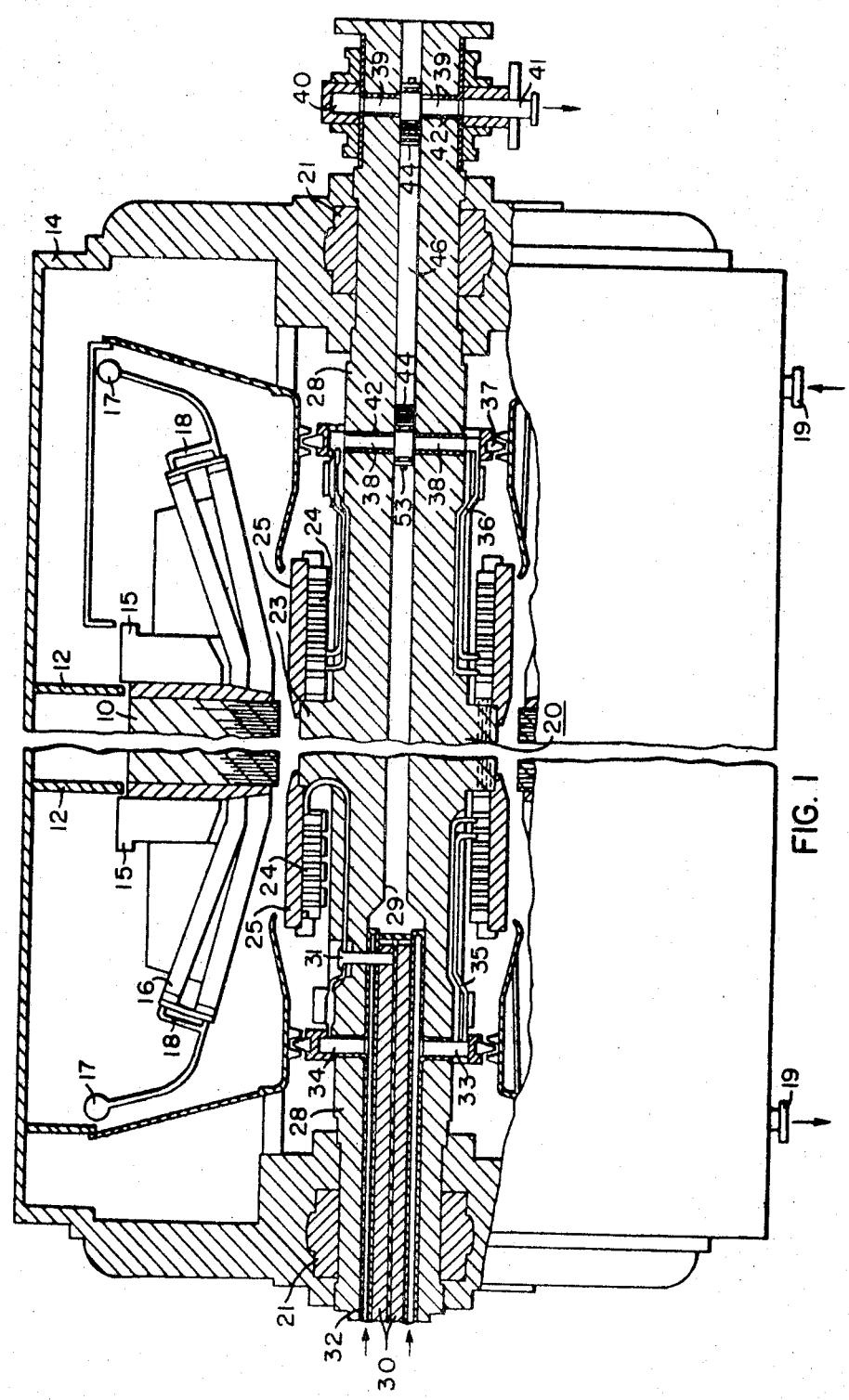
FIG. 1 is a view in longitudinal section, partly in elevation, of a turbine generator having a liquid cooled rotor embodying the invention.

Referring first to FIG. 1 of the drawings, the invention is shown embodied in a large turbine generator of typical construction although it should be understood that the rotor of the present invention may be used in any desired type of dynamoelectric machine.

As shown, the generator has a stator core 10 supported by frame rings 12 in a substantially gas-tight outer housing 14. The stator core 10 is of the usual laminated construction, having a generally cylindrical bore therethrough, and the laminations are clamped between suitable end plates 15 in the usual manner. The stator core 10 has longitudinal slots in its inner periphery for reception of a stator winding 16 which may be of any suitable type but which is shown as being a liquid cooled winding. For this purpose circular inlet and discharge manifolds 17 are provided at opposite ends of the machine and connected through suitable means, generally indicated at 18, to circulate a coolant liquid such as water through the coils of the stator winding 16. The manifolds 17 may be connected as indicated diagrammatically at 19 to an external recirculating system of any desired type. The construction of a liquid cooled stator suitable for use with the present invention is disclosed and claimed in a copending application of F. P. Fidei, Ser. No. 31,296, filed Apr. 23, 1970, and assigned to the assignee of the present invention, now U.S. Pat. No. 3,634,705, although other suitable constructions might also be used. The housing 14 is filled with a coolant gas, preferably hydrogen, which is circulated through the interior of the housing to cool the stator core by flow through the usual radial cooling ducts, and suitable baffling of any desired type may be provided in the housing to direct the flow of gas therein.

The machine has a rotor member 20 which is disposed in the bore of the stator core 10 and supported in bearings 21 at the end of the housing 14. The bearing assemblies preferably include gland seals to prevent leakage of gas along the rotor shaft. The bearings and gland seals may be of any suitable or usual construction and have not been illustrated in detail as they are not a part of the invention. The rotor 20 has a central body portion 23 which is provided with peripheral slots in the usual manner for the reception of a rotor winding 24. The rotor winding 24, which is the field winding of the generator, may be of any suitable type and is constituted of copper conductors which extend longitudinally through the slots of the rotor body and generally circumferentially in the end turn portions which are visible in the drawing. The end turns of the rotor winding are supported against rotational forces by the usual heavy retaining rings 25. The winding conductors 24 are made hollow with central passages extending through them through which the coolant liquid flows from one end to the other through both the circumferential end turn portions and the straight longitudinal portions. Any suitable or desired type of flow pattern may be utilized for the coolant flow, and any desired type of electrical circuit may be used.

The rotor 20 has shaft portions 28 extending axially from the body portion 23 at each end thereof and including journal portions supported in the bearings 21. The shaft portions have an axial bore 29 extending therethrough and, in accordance with the usual practice, the bore preferably extends for the entire length of the rotor as shown. In the illustrated embodiment of the invention, axial electrical leads 30 extend through the bore 29 at the left hand end of the rotor, as viewed in the drawing, and are connected to the rotor winding by means of radial leads 31. The coolant liquid, which is preferably water, is introduced at this end of the rotor through an annular passage 32 which surrounds the leads 30 in the bore 29 and which is connected to an annular distribution chamber 33 by radial passages 34. The chamber 33 extends circumferentially around the surface of the rotor shaft 28 and is connected by generally axial connectors 35 of any suitable type to the conductors 24 of the rotor winding. The annular passage 32 may be made of two concentric tubes of stainless steel or other suitable corrosion resistant material, and thus serves the purpose of a corrosion resistant liner for the shaft bore 29. The tubes of which the annular passage 32 is made are anchored at the inner end to tubular stainless steel liners in the radial passages 34. The tubes 32 are otherwise free to expand axially in the bore 29 to provide for differential thermal expansion as more fully explained in the above-mentioned Curtis et al application.

At the right hand end of the rotor, as seen in the drawing, which is the discharge end, the water flows from the rotor winding conductors through connectors 36 to an annular chamber 37 extending circumferentially around the surface of the rotor shaft 28. The connectors 35 and 36 at opposite ends of the winding 24 may be of similar construction and each connector includes an insulating section. The water in the chamber 37 flows radially inward through radial passages 38 to the bore 29 of the rotor shaft, and axially through the bore to another set of radial passages 39 at or near the outward end of the rotor shaft, through which it is discharged into a stationary annular chamber 40 extending around the circumference of the shaft. The water is drained from the chamber 40 as indicated at 41 for recirculation, any suitable type of sealing means being provided to prevent escape of water. The radial passages 38 and 39 are provided with tubular liners 42 of stainless steel and the bore 29 is similarly lined with a tubular liner 43 of the same material.

It will be seen that at the discharge end of the rotor, the liner 43 must be attached to each of the liners 42 of the radial passages 38 and 39. Since the tubular liner 43 is thus anchored at both ends, any differential expansion of the liner 43 relative to the rotor shaft 28 will result in extremely high stresses applied to the liners 42 and the joints between the liners 42 and 43 or to the liner 43 itself. It is necessary, therefore, to provide some means for absorbing the differential expansion to prevent the occurrence of these excessive stresses.

Figure 2:
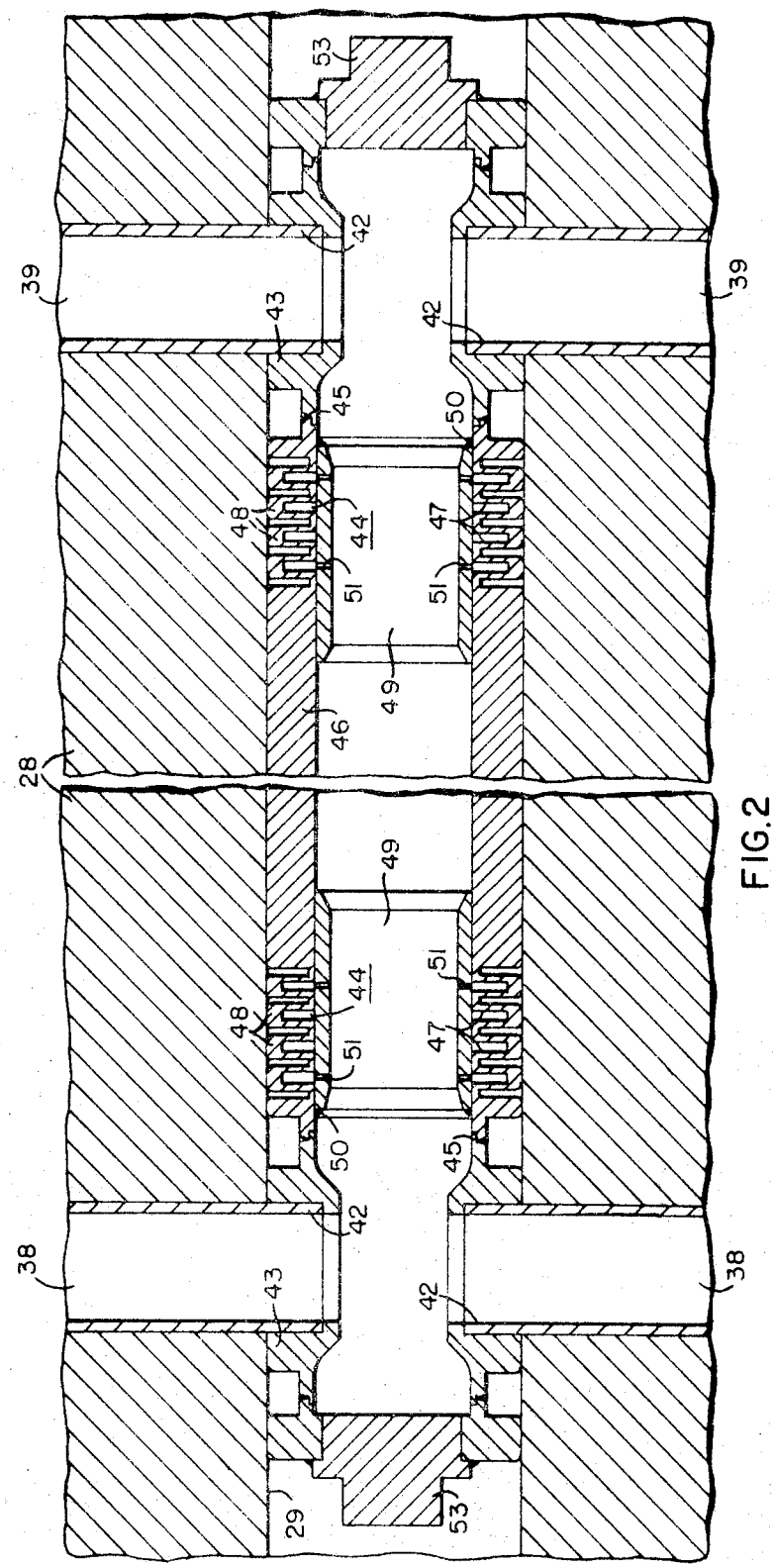
FIG. 2 is an enlarged fragmentary longitudinal sectional view of the discharge end of the rotor shaft.

In accordance with the present invention, differential thermal expansion of the stainless steel liner 43 is absorbed by a bellows device 44 interposed in the liner 43. As shown more particularly in FIG. 2, the bellows 44 is of special design and is interposed directly in the liner 43 by welding the bellows in place as indicated at 45. The bellows device 44 is shown in the drawing as consisting of two separated sections with a solid section 46 of liner between them, but this is done only for convenience in manufacture and the bellows 44 could be a single bellows of suitable length. The bellows device 44 is preferably an integral member machined from a single piece of stainless steel tubing as shown in the drawing. Each section of the bellows consists of a number of convolutions 47 comprising a series of relatively thin radial wall portions or diaphragms connected at their inner and outer circumferences to form a bellows. The diaphragms are proportioned to have sufficient flexibility to allow them to flex so that the bellows can expand and contract and thus permit axial expansion and contraction of the stainless steel liner in which it is inserted.

It will be noted that the bellows 44 differs in important respects from the conventional types of metal bellows. The usual commercially available bellows has relatively thin walls to obtain the desired flexibility. Such thin walls are particularly susceptible to corrosion by heated water flowing through the bellows and are also susceptible to erosion by metallic particles or corrosion debris carried in the water which flows at a relatively high velocity. Such corrosion debris also would tend to collect in the convolutions of a conventional bellows because of the relatively high centrifugal forces to which it is subjected in the rotor of a large generator. Furthermore, the conventional bellows has relatively sharp or narrow ridges on its outer surface so that it would have essentially line contact with the surface of the shaft bore, and the high centrifugal force would result in excessive bearing pressures and possible failure of the bellows.

In accordance with the present invention, a bellows design is provided which eliminates the above mentioned problems of conventional bellows. It will be seen from FIG. 2 that since the bellows is machined as described above from a stainless steel tube, the outer surfaces 48 of the bellows convolutions are generally cylindrical and the diaphragm can be made thick enough to resist corrosion but with sufficient flexibility to permit expansion and contraction of the bellows. The cylindrical surfaces 48 engage the inner surface of the shaft bore 29 with contacts of substantial area so that no excessive bearing pressures occur even under the relatively high centrifugal forces due to the high speed of rotation of the rotor. A tubular member 49, preferably also of stainless steel, is provided on the inside of each section of the bellows 44. Each tube 49 is welded to the bellows at one end 50 but not at the other end so that the bellows is free to expand and contract without constraint by the tube 49. The tube 49 extends over the convolutions 47 and prevents the possibility of any accumulation of corrosive debris in the convolutions of the bellows since it prevents access to the convolutions, and also assures that the water flowing through the bellows will flow smoothly and uniformly. A plurality of small holes 51 may be provided through the tube 49 to flush any stagnant water which may tend to accumulate in the convolutions of the bellows. The bellows device 44 is inserted directly in the liner 43, as mentioned above, and the radial liners 42 of the radial passages 38 and 39 are welded directly in the liner 43. The ends of the axial liner 43 are closed and sealed by suitable plugs or partitions 53 to prevent leakage of water from the protected areas of the rotor.

It will now be seen that a corrosion resistant liner for a rotor shaft bore has been provided in which the problem of differential thermal expansion is provided for in a simple and effective manner by means of a special bellows device. The bellows is preferably made of the same corrosion resistant material as the liner, preferably stainless steel, and its design is such that any reasonable amount of thermal expansion of the liner can be absorbed by compression of the bellows without resulting in excessive stresses at any point. A particular embodiment of the invention has been shown and described for the purpose of illustration, but it will be apparent that other embodiments and equivalent constructions are possible and all such modifications and embodiments are within the scope of the invention.

We claim as our invention:

1. A rotor for a dynamoelectric machine having a body portion and shaft portions, windings on the body portion having passages for circulation of a liquid coolant therethrough, a coolant distributing chamber on at least one of the shaft portions, means for connecting the chamber to said winding passages, said one shaft portion having a central axial bore adapted for coolant flow therethrough, a radial passage connecting the bore to said chamber, a liner of corrosion-resistant material in said bore, and bellows means interposed in said liner to permit thermal expansion of the liner, said bellows having a plurality of convolutions of generally rectangular cross-section with cylindrical outer surfaces and including an internal tube attached to the bellows at one end and extending over the convolutions, said tube having a plurality of holes therethrough.

2. A rotor for a dynamoelectric machine having a body portion and shaft portions, windings on the body portion having passages for circulation of a liquid coolant therethrough, a coolant distributing chamber on at least one of the shaft portions, means for connecting the chamber to said winding passages, said one shaft portion having a central axial bore adapted for coolant flow therethrough, a radial passage connecting the bore to said chamber, a liner of corrosion-resistant material in said bore, and bellows means interposed in said liner to permit thermal expansion of the liner, a second radial passage spaced from the first-mentioned radial passage and connecting said bore to the surface of the rotor, and a corrosion-resistant liner in each radial passage, said last-mentioned liners being joined to said bore liner and said bellows being interposed in the bore liner between the radial passages.

3. In a rotor member having an axial bore and a corrosion-resistant liner in said bore, a bellows interposed in the liner to permit thermal expansion thereof, said bellows comprising a plurality of convolutions of generally rectangular cross-section having cylindrical outer surfaces for engagement with the surface of said bore, and the radial wall portions of said convolutions being adapted to flex to effect expansion and contraction of the bellows.

4. The structure defined in claim 3 in which the bellows has an internal tube attached thereto at one end and extending over the convolutions, said tube having a plurality of holes therethrough.

* * * * *